United States Patent
Hoang et al.

(10) Patent No.: US 11,069,978 B2
(45) Date of Patent: Jul. 20, 2021

(54) METHOD OF MANUFACTURING A RADIO-FREQUENCY MODULE WITH A CONFORMAL SHIELD ANTENNA

(71) Applicant: Skyworks Solutions, Inc., Irvine, CA (US)

(72) Inventors: Dinhphuoc Vu Hoang, Anaheim, CA (US); Robert Francis Darveaux, Corona Del Mar, CA (US); Anthony James LoBianco, Irvine, CA (US); Lori Ann DeOrio, Irvine, CA (US); Hoang Mong Nguyen, Fountain Valley, CA (US); Ki Wook Lee, Irvine, CA (US); Hardik Bhupendra Modi, Irvine, CA (US); Foad Arfaei Malekzadeh, Ottawa (CA); Stephen Joseph Kovacic, Ottawa (CA); René Rodriguez, Rancho Santa Margarita, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 436 days.

(21) Appl. No.: 15/943,383

(22) Filed: Apr. 2, 2018

(65) Prior Publication Data
US 2018/0294568 A1     Oct. 11, 2018

Related U.S. Application Data

(60) Provisional application No. 62/483,259, filed on Apr. 7, 2017.

(51) Int. Cl.
*H01Q 9/04*      (2006.01)
*B29C 41/42*      (2006.01)
(Continued)

(52) U.S. Cl.
CPC .......... *H01Q 9/0407* (2013.01); *B29C 41/42* (2013.01); *H01Q 5/35* (2015.01); *H01Q 9/065* (2013.01);
(Continued)

(58) Field of Classification Search
CPC .................................................. H01Q 9/0407
See application file for complete search history.

(56) References Cited

U.S. PATENT DOCUMENTS 3,775,121 A * 11/1973 Sharp ........................ G03C 5/58
                                                    430/311
4,070,676 A * 1/1978 Sanford ............... H01Q 9/0414
                                                 343/700 MS (Continued)

FOREIGN PATENT DOCUMENTS

| CN | 107069208 A | 8/2017 |
|---|---|---|
| CN | 206774674 U | 12/2017 |

OTHER PUBLICATIONS

Suga, et al., Cost-Effective 60-GHz Antenna Package With End-Fire Radiation for Wireless File-Transfer System, IEEE Transactions on Microwave Theory and Techniques, vol. 58, No. 12, Dec. 2010, 7 pp.

*Primary Examiner* — Galen H Hauth
(74) *Attorney, Agent, or Firm* — Knobbe, Martens, Olson & Bear LLP

(57) ABSTRACT

A method for manufacturing a package with a conformal shield antenna includes forming a mold compound layer, attaching the mold compound layer to a printed circuit board, applying a conformal shield layer on a first surface of the mold compound layer, the mold compound layer disposed between the conformal shield layer and the printed circuit board module, and shaping the conformal shield layer to define a planar antenna structure. Optionally, the method includes forming a cavity in the mold compound layer, applying a cover layer over the cavity to enclose the cavity and hardening the cover layer.

12 Claims, 19 Drawing Sheets

(51) Int. Cl.
*H01Q 5/35* (2015.01)
*H01Q 9/06* (2006.01)
*H01Q 1/52* (2006.01)
*B29L 31/34* (2006.01)
*H01Q 1/38* (2006.01)
*H01Q 21/06* (2006.01)
*H01Q 1/22* (2006.01)

(52) U.S. Cl.
CPC .... *B29L 2031/3456* (2013.01); *H01Q 1/2283* (2013.01); *H01Q 1/38* (2013.01); *H01Q 1/526* (2013.01); *H01Q 21/065* (2013.01)

(56) References Cited

U.S. PATENT DOCUMENTS

| | | | |
|---|---|---|---|
| 4,963,891 A * | 10/1990 | Aoyagi | H01Q 1/38 343/700 MS |
| 5,844,523 A * | 12/1998 | Brennan | H01Q 1/2225 343/700 MS |
| 7,551,141 B1 * | 6/2009 | Hadley | G06K 19/07718 343/700 MS |
| 8,760,352 B2 | 6/2014 | Rao et al. | |
| 2006/0250308 A1 | 11/2006 | Pinel | |
| 2007/0290941 A1 | 12/2007 | Brown | |
| 2012/0050125 A1 | 3/2012 | Leiba | |
| 2012/0212384 A1 | 8/2012 | Kam | |
| 2012/0256796 A1 | 10/2012 | Leiba | |
| 2014/0091979 A1 * | 4/2014 | Fakharzadeh | H01Q 1/36 343/848 |
| 2014/0145884 A1 | 5/2014 | Dang | |
| 2016/0329299 A1 | 11/2016 | Lin | |
| 2017/0040266 A1 | 2/2017 | Lin | |
| 2017/0117229 A1 | 4/2017 | Kumbhat | |
| 2017/0236776 A1 | 8/2017 | Huynh | |
| 2017/0250466 A1 * | 8/2017 | Schlaffer | H05K 1/185 |
| 2018/0007800 A1 * | 1/2018 | Shindou | B32B 37/06 |
| 2018/0159203 A1 | 6/2018 | Baks | |
| 2018/0191052 A1 | 7/2018 | Ndip | |
| 2018/0205134 A1 | 7/2018 | Khan | |

* cited by examiner

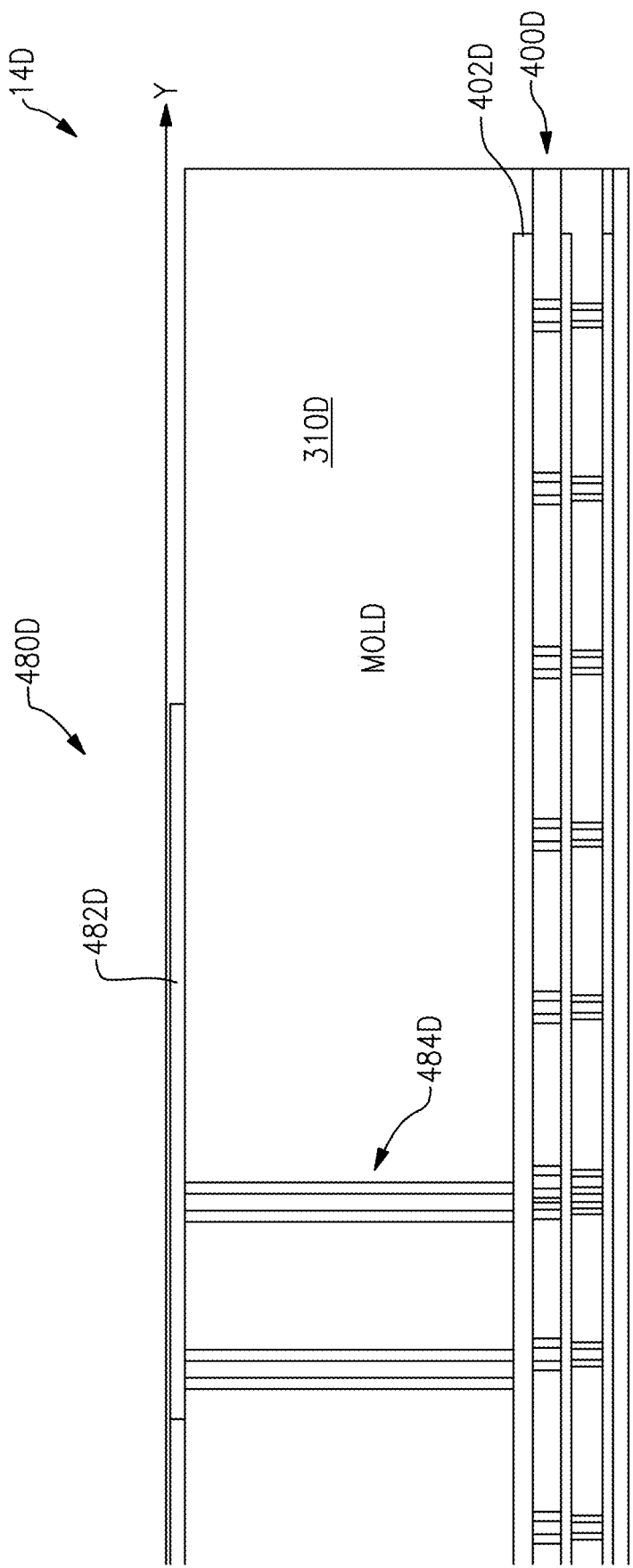

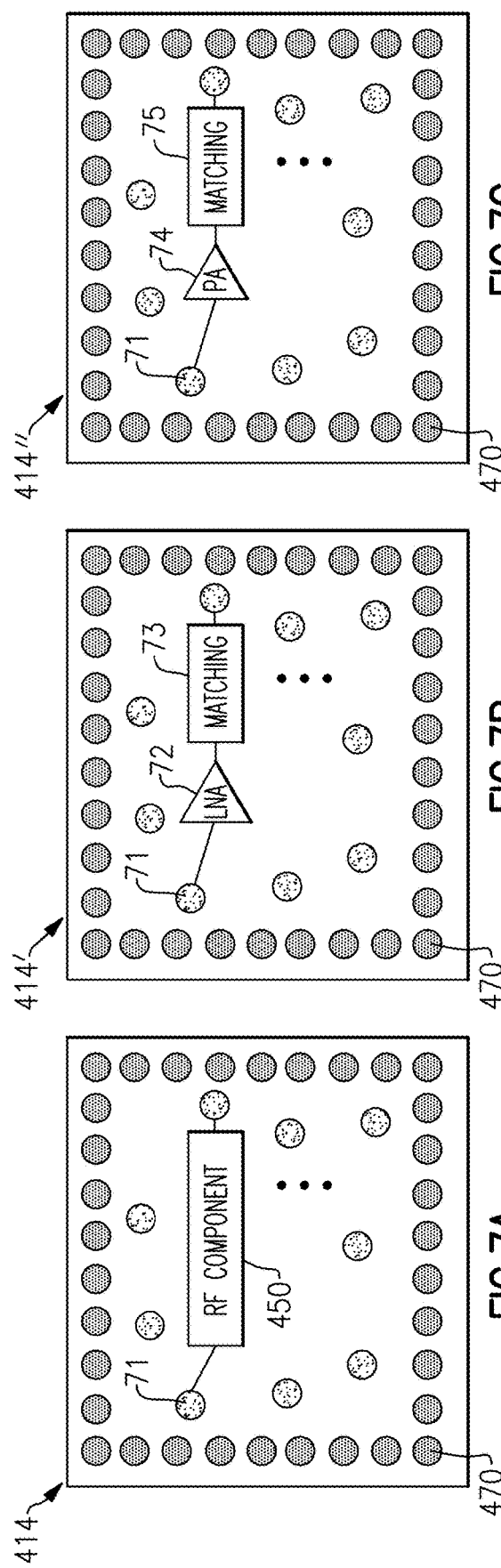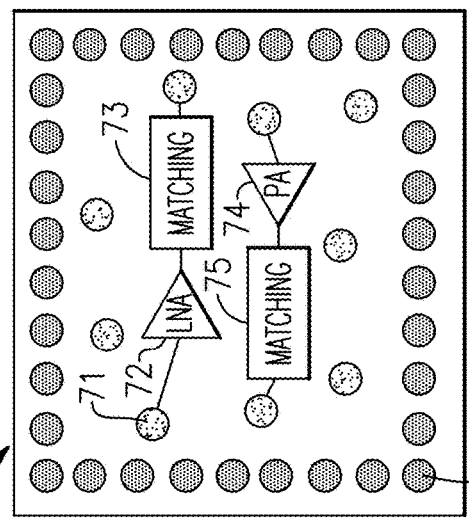
FIG. 7A  FIG. 7B  FIG. 7C  FIG. 7D

METHOD OF MANUFACTURING A RADIO-FREQUENCY MODULE WITH A CONFORMAL SHIELD ANTENNA

CROSS-REFERENCE TO RELATED APPLICATIONS

Any and all applications for which a foreign or domestic priority claim is identified in the Application Data Sheet as filed with the present application are hereby incorporated by reference under 37 CFR 1.57, and should be considered a part of this specification.

BACKGROUND

Field

Aspects of the disclosure relate to methods for manufacturing a package with a conformal shield antenna for electronic systems, such as radio-frequency (RF) electronics.

Description of the Related Art

Conventional antennas involve incorporating the antenna on a printed circuit board (PCB), such as on a PCB module layer. The antenna is applied on a top layer of the PCB module, and is covered by a mold compound. However, such conventional antennas have several drawbacks. For example, the antenna structure is larger in size due to extra PCB layers on the module. Additionally, the manufacturing of said antennas takes longer, is more costly, and more difficult as PCB manufacturers struggle to vary the thickness of PCB modules to achieve a desired antenna performance.

SUMMARY

Accordingly, there is a need for an improved method of manufacturing an antenna that addresses some of the disadvantages in conventional antenna designs used on printed circuit boards (PCB) or on module PCB layers.

In accordance with one aspect, a conformal shield antenna is disposed on top of a mold compound so that the mold compound is disposed between the conformal shield antenna and a PCB module. The thickness of the mold compound can be varied to optimize the performance of the antenna. Optionally, the conformal shield antenna can be connected to a ground layer (e.g., ground plane) in the PCB module via one or more vias. In another embodiment, the conformal shield antenna can be connected to a ground layer in the PCB module via one or more bondwires.

In accordance with one aspect, a conformal shield antenna is disposed on top of a mold compound so that the mold compound is disposed between the conformal shield antenna and a PCB module. The thickness of the mold compound can be readily varied to optimize the performance of the antenna.

In accordance with one aspect, a method of making an antenna structure is provided. The method comprises forming a mold compound layer, attaching the mold compound layer to a printed circuit board, applying a conformal shield layer on a first surface of the mold compound layer, the mold compound layer disposed between the conformal shield layer and the printed circuit board, and shaping the conformal shield layer to define a planar antenna structure.

In accordance with another aspect, a method of making an antenna structure is provided. The method comprises forming a mold compound layer, forming a cavity in the mold compound layer, attaching the mold compound layer to a printed circuit board, applying a cover layer over the cavity to enclose the cavity, and hardening the cover layer. The method also comprises applying a conformal shield layer on a first surface of the mold compound layer, the mold compound layer disposed between the conformal shield layer and the printed circuit board, and shaping the conformal shield layer to define a planar antenna structure.

BRIEF DESCRIPTION OF THE DRAWINGS

FIG. 5B is a schematic cross-sectional view of the an integrated antenna module design of FIG. 5A.

FIGS. 7A to 7D illustrate example radio frequency component layers of radio frequency circuit assemblies according to certain embodiments.

DETAILED DESCRIPTION

Figure 1:
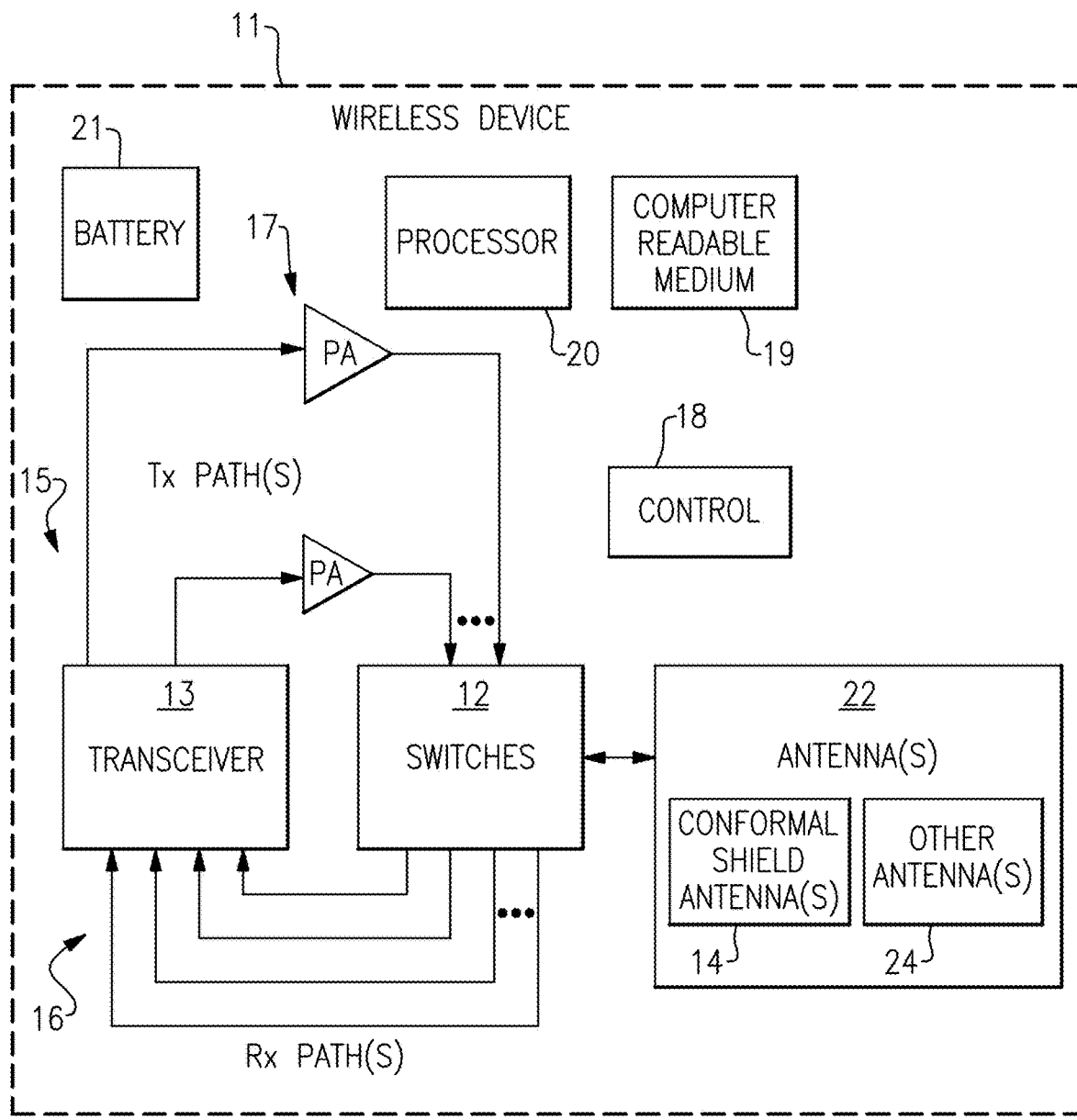
FIG. 1 is a block diagram of one example of a wireless device.

The headings provided herein, if any, are for convenience only and do not necessarily affect the scope or meaning of the claimed invention.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a figure and/or a subset of the elements illustrated in a figure. Further, some embodiments can incorporate any suitable combination of features from two or more figures.

There is a desire for a relatively low cost packaging technology. Aspects of this disclosure relate to a package with an integrated antenna that is smaller in size than conventional antennas, and that costs less to manufacture. The package can include a laminated substrate with an antenna. An electronic component or die, such as a radio frequency (RF) component, can be disposed along a bottom layer of the laminate substrate. Solder bumps can be disposed around the electronic component and electrically connected to the ground plane. The solder bumps can attach the module to a carrier or directly to a system board. The electronic component can be surrounded by solder bumps. For example, outside edges of the electronic component can have ground solder bumps that are connected to the ground plane by way of vias. The ground solder bumps around the electronic component can be connected to ground of a carrier or system board.

One aspect of this disclosure is a module that includes a multi-layer substrate, an antenna, a radio frequency (RF) component, and conductive features disposed around the RF component. The multi-layer substrate has a first side and a second side opposite to the first side. The multi-layer substrate includes a ground plane. The antenna is on the first side of the multi-layer substrate. The RF component is on the second side of the multi-layer substrate such that the ground plane is positioned between the antenna and the RF component. The conductive features are disposed around the RF component and electrically connected to the ground plane. The conductive features and the ground plane configured to provide shielding for the RF component.

Another aspect of this disclosure is an RF circuit assembly that includes a laminate substrate having a first side and a second side opposite the first side, an antenna on the first side of the laminate substrate, an RF component attached on the second side of the laminate substrate, and a plurality of solder bumps disposed around the RF component. The laminate substrate includes a ground plane that is positioned between the antenna and the RF component. The solder bumps form at least a portion of an electrical connection to the ground plane to thereby form at least a portion of a shielding structure around the RF component.

Another aspect of this disclosure is system board assembly that includes a laminate substrate having a first side and a second side opposite to the first side, an antenna on the first side of the laminate substrate, an RF component attached on the second side of the laminate substrate, a plurality of solder bumps disposed around the RF component, and a system board. The laminate substrate includes at least one layer forming a ground plane. The ground plane is positioned between the antenna and the RF component. The plurality of solder bumps are electrically connected to the ground plane. The system board can include ground pads electrically connected to ground plane by way of the plurality of solder bumps such that a shielding structure is formed around the RF component.

Overview of Wireless Devices

FIG. 1 is a schematic block diagram of one example of a wireless or mobile device 11 that can include one or more antenna switch modules. The wireless device 11 can include antenna switch modules implementing one or more features of the present disclosure.

Antenna switch modules can be used within the wireless or a mobile device 11 implementing a 5G telecommunication standard that may utilize 30 GHz and 60-70 GHz frequency bands. Additionally, the 3G, 4G, LTE, or Advanced LTE telecommunication standards can be used with the antenna switch modules in the wireless or mobile device 11, as described herein.

The example wireless device 11 depicted in FIG. 1 can represent a multi-band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, about 22 radio frequency spectrum bands.

In certain embodiments, the wireless device 11 can include an antenna switch module 12, a transceiver 13, at least one antenna 22, power amplifiers 17, a control component 18, a computer readable medium 19, a processor 20, and a battery 21.

The transceiver 13 can generate RF signals for transmission via the antenna 14. Furthermore, the transceiver 13 can receive incoming RF signals from the antenna 14. The at least one antenna 22 can include one or more antennas 14 defined by a conformal shield layer of a printed circuit board, such as any of those described herein. Other types antennas 24, such as a dipole antenna, may also be included.

It will be understood that various functionalities associated with transmitting and receiving of RF signals can be achieved by one or more components that are collectively represented in FIG. 1 as the transceiver 13. For example, a single component can be configured to provide both transmitting and receiving functionalities. In another example, transmitting and receiving functionalities can be provided by separate components.

In FIG. 1, one or more output signals from the transceiver 13 are depicted as being provided to the antenna 22 via one or more transmission paths 15. In the example shown, different transmission paths 15 can represent output paths associated with different bands and/or different power outputs. For instance, the two different paths shown can represent paths associated with different power outputs (e.g., low power output and high power output), and/or paths associated with different bands. The transmit paths 15 can include one or more power amplifiers 17 to aid in boosting a RF signal having a relatively low power to a higher power suitable for transmission. Although FIG. 1 illustrates a configuration using two transmission paths 15, the wireless device 11 can be adapted to include more or fewer transmission paths 15.

In FIG. 1, one or more detected signals from the antenna 22 are depicted as being provided to the transceiver 13 via one or more receiving paths 16. In the example shown, different receiving paths 16 can represent paths associated with different bands. For example, the four example paths 16 shown can represent quad-band capability that some wireless devices are provided with. Although FIG. 1 illustrates a configuration using four receiving paths 16, the wireless device 11 can be adapted to include more or fewer receiving paths 16.

To facilitate switching between receive and/or transmit paths, the antenna switch module 12 can be included and can be used electrically connect the antenna 22 to a selected transmit or receive path. Thus, the antenna switch module 12 can provide a number of switching functionalities associated with an operation of the wireless device 11. The antenna switch module 12 can include a multi-throw switch configured to provide functionalities associated with, for example, switching between different bands, switching between different power modes, switching between transmission and receiving modes, or some combination thereof. The antenna switch module 12 can also be configured to provide additional functionality, including filtering and/or duplexing of signals.

FIG. 1 illustrates that in certain embodiments, the control component 18 can be provided for controlling various control functionalities associated with operations of the antenna switch module 12 and/or other operating component(s). For example, the control component 18 can aid in providing control signals to the antenna switch module 12 so as to select a particular transmit or receive path.

In certain embodiments, the processor 20 can be configured to facilitate implementation of various processes on the wireless device 11. The processor 20 can be a general purpose computer, special purpose computer, or other programmable data processing apparatus. In certain implementations, the wireless device 11 can include a computer-readable memory 19, which can include computer program instructions that may be provided to and executed by the processor 20.

The battery 21 can be any suitable battery for use in the wireless device 11, including, for example, a lithium-ion battery.

Integrated Antenna Modules

Disclosed herein are embodiments of integrated antenna modules including a conformal shield antenna on a printed circuit board. Advantageously, the conformal shield antenna can be sized and shape to cover any frequency range so long as the antenna size and shape fit on the printed circuit board.

Figure 2A:
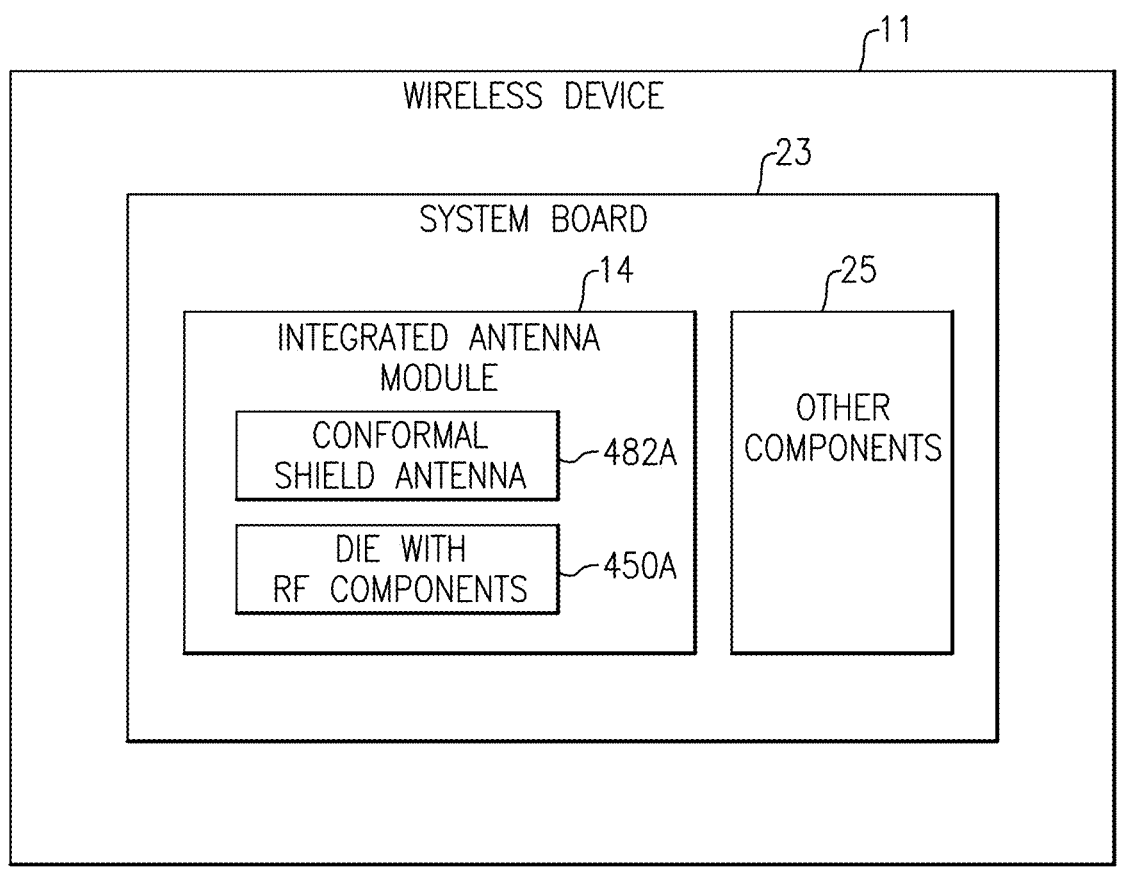
FIG. 2A is a block diagram of another example of a wireless device with an integrated antenna module.

FIG. 2A illustrates a wireless device 11 with a system board assembly 23. The system board assembly 23 can have an integrated antenna module 14 and other component(s) 25 disposed on the system board assembly 23 according to an embodiment. The system board 23 can be any suitable application board, such as a phone board for a mobile phone. Solder bumps of the antenna in the integrated antenna module 14 can be in physical contact with one or more ground connections of the system board 23. Accordingly, a shielding structure can surround an RF component 450A of the antenna in an integrated antenna module 14 in three dimensions. The shielding structure can provide shielding between the RF component 450 and the antenna layer 480 of the antenna in an integrated antenna module 14. The shielding structure can provide shielding between the RF component 450A and one or more other components 25 disposed on the system board 23. Accordingly, the RF component 450A can be shielded from radiation emitted by the one or more other components 25. At the same time, the other component(s) 25 can be shielded from radiation emitted from the RF component 450A.

Figure 2B:
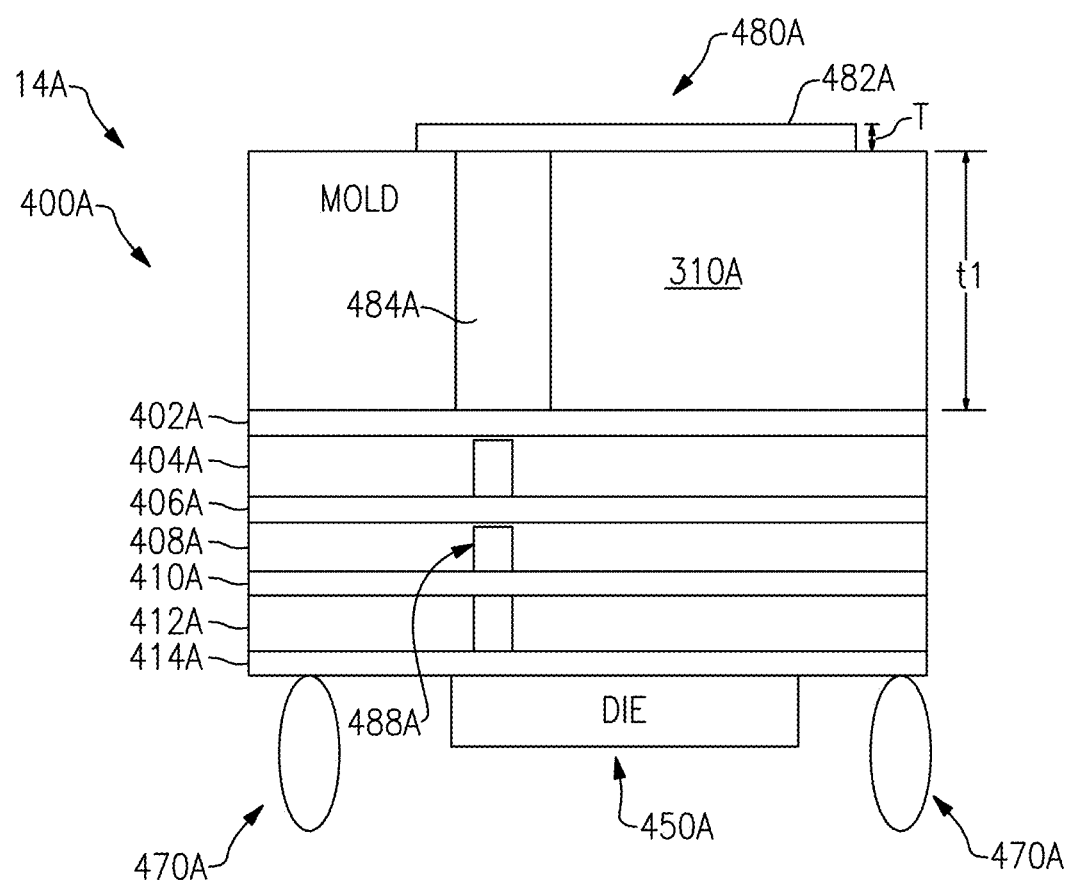
FIG. 2B is a schematic view of an embodiment of an integrated antenna module.

FIG. 2B shows one embodiment of an integrated antenna module or package 14A. In one embodiment, the package 14A can be a radiofrequency (RF) circuit assembly The package 14A includes a printed circuit board (PCB) 400A with a plurality of layers 402A-414A (e.g., a multi-layer module). The plurality of layers can include dielectric layers, a ground layer, routing layers, etc. A die 450A (with one or more RF components) can be attached to one side of the PCB 400A and surrounded by a plurality of solder balls 470A. A mold compound 310A (e.g., plastic mold compound) having a thickness t1 can be disposed on another side of the PCB 400A. An antenna structure 480A can include a metal layer 482A disposed on top of the mold compound 310A. The metal layer 482A can in one embodiment be made of copper. In another embodiment, the metal layer 482A can be made of silver. In still another embodiment, the metal layer 482A can be made of another suitable material. Accordingly, the mold compound 310A is disposed between metal layer 482A of the antenna structure 480A and one or more layers 402A-414A of the PCB 400A. Optionally, one or move vias 484A, 488A can connect the metal layer 482A with one or more layers 402A-414A of the module 200A, such as a ground layer.

In one embodiment, the metal layer 482A is formed using a conformal shield process. In such a process, metal can be sputtered onto the mold compound 310A. In another embodiment, the metal layer 482A can be sprayed on the mold compound 310A. In still another embodiment, the metal layer 482A can be printed on the mold compound 310A. Metal is then removed from the metal layer 482A to define the desired shape of the antenna, such as via an ablation process or etching process to obtain a desired performance for the antenna 480A. The thickness T of the metal layer 482A can in some embodiments be between 500 µm and about 700 µm. In another embodiment, the thickness T can be about 1 mm. In other embodiments, the thickness T of the metal layer 482A can be between 2 µm and about 10 µm. However, a desired performance of the antenna 480A can be varied (e.g., optimized) by changing the shape of the metal layer 482A as discussed above, regardless of the thickness T of the metal layer 482A, such that any effect on antenna performance caused by the thickness T of the metal layer 482A can be adjusted (e.g., removed) by adjusting the shape of the metal layer 482A. Advantageously, the performance of the antenna 480A can be varied (e.g., optimized) by varying the shape of the metal layer 482A and/or varying the thickness t1 of the mold compound 310A, thereby varying the thickness of the package 14A. Moreover, varying the thickness of the package 14A (in the Z direction) can easily be done by varying the thickness of the mold compound 310A. Further, the package 14A is advantageously smaller (e.g., smaller in the Z direction) than conventional packages, which results in improved antenna performance.

Figure 2C:
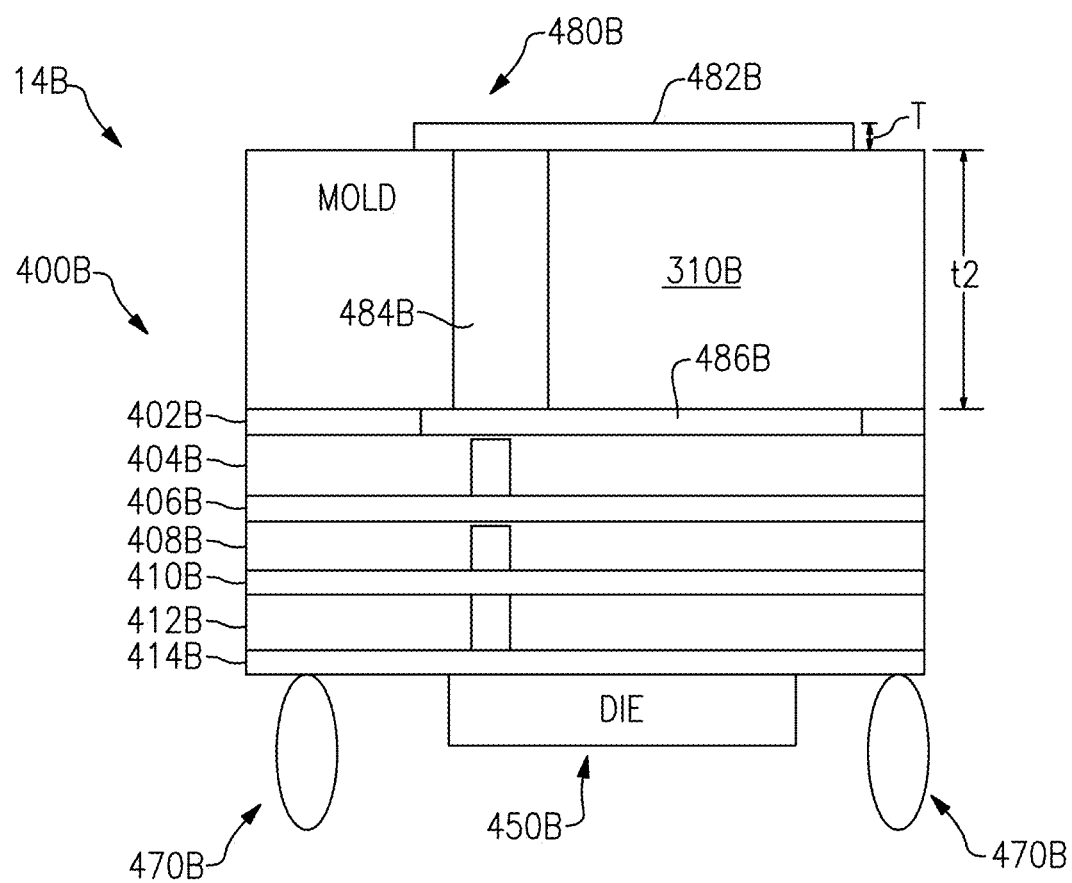
FIG. 2C is a schematic view of an embodiment of an integrated antenna module.

FIG. 2C shows an embodiment of a module or package 14B that is similar to package 14A, except as described below. The package 14B is constructed similar to the package 14A shown in FIG. 2B, except as noted below. Thus, the reference numerals used to designate the various components of the package 14B are identical to those used for identifying the corresponding components of the package 14A in FIG. 2B, except that a "B" has been added to the reference numerals. As shown in FIG. 2C, the package 14B includes a metal layer 486B on a top layer of the PCB 400B, which can serve as a ground layer. However, the metal layer 486B can be located in other layers (e.g., the second layer, third layer, etc.) of the PCB 400B. The location of the metal layer 486B relative to the metal layer 482B of the antenna structure 480B can in one embodiment be chosen to alter the performance of the antenna 480B. In another embodiment, the shape of the metal layer 486B can be varied to alter the performance of the antenna 480B. The mold compound 310B can have a thickness t2 between the metal layer 482B and the PCB 400B. In one embodiment, the metal layer 486B can function as a transformer to the antenna 480B, controlling an impedance of the second layer to feed the antenna 480A.

Figure 2D:
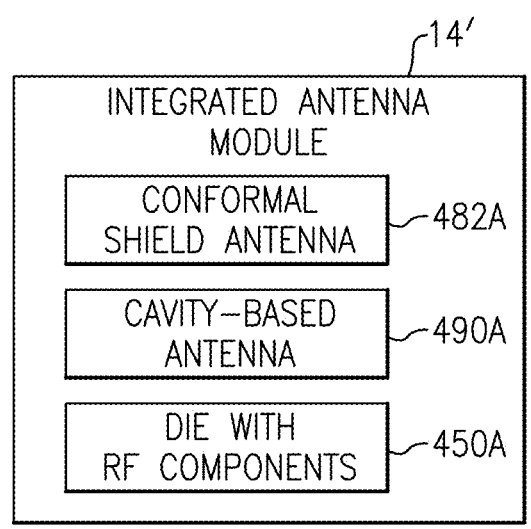
FIG. 2D is a schematic view of an embodiment of an integrated antenna module.

FIG. 2D show an embodiment of an integrated antenna module 14'. The module 14' can include one or more conformal shield antennas 482A. The module 14' can also include one or more cavity based antennas 490C. the module 14' can also include a die with one or more RF components 450A.

Figure 2E:
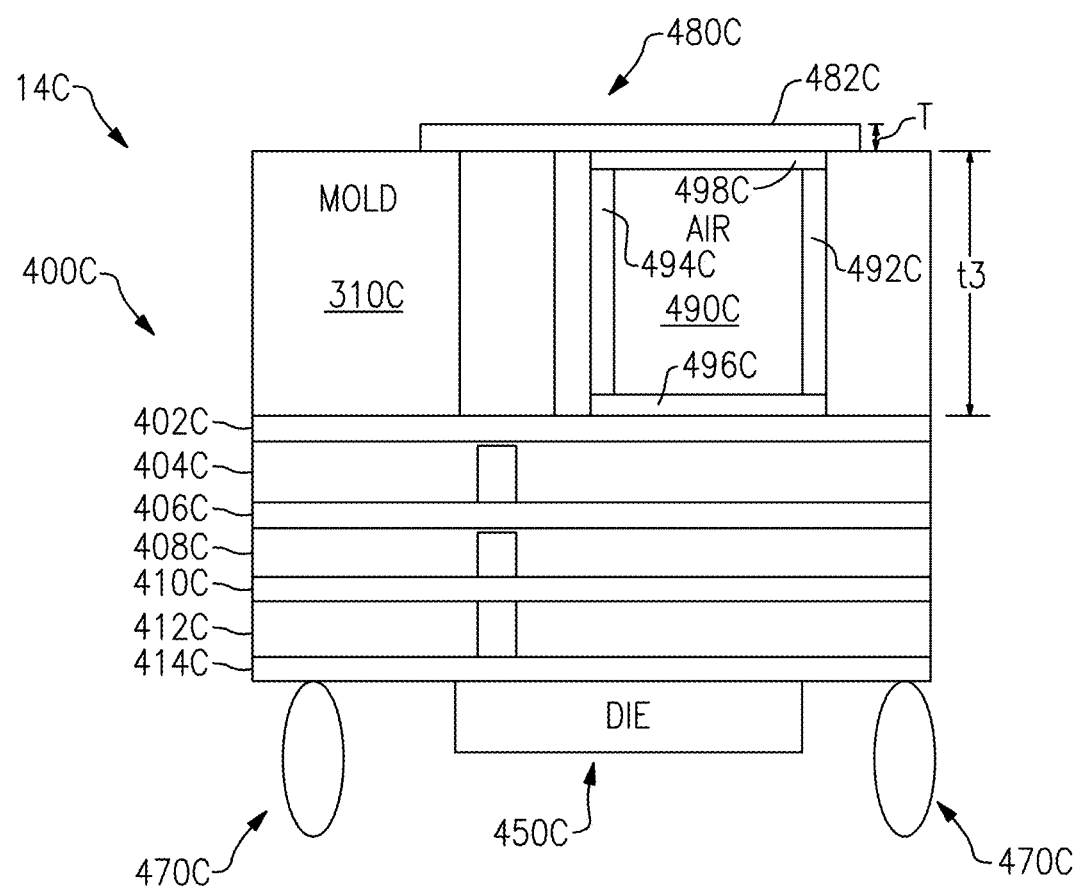
FIG. 2E is a schematic view of an embodiment of an integrated antenna module.

FIG. 2E shows a schematic view of an embodiment of a package 14C that is similar to package 14A in FIG. 2B, except as described below. The package 14C is constructed similar to the package 14A shown in FIG. 2B, except as noted below. Thus, the reference numerals used to designate the various components of the package 14C are identical to those used for identifying the corresponding components of the package 14A in FIG. 2B, except that a "C" has been added to the reference numerals. In FIG. 2E, a cavity 490C is formed in the mold compound 310C between the metal layer 482C and the PCB 400C. The mold compound 310C has a thickness t3. Optionally, the cavity 490C can be filled with air. Optionally, the cavity 490C can be bounded by layers 492C, 494C, 496C, 498C to define a box that can house a variety of components. The layers 492C, 494C, 496C, 498C can be of a material different than the material of the mold compound 310C and different than the material that fills the cavity 490C. In some embodiments, the cavity 490C can optionally be filled (e.g., with high dielectric ceramics, high dielectric resonator, etc.).

Figure 2F:
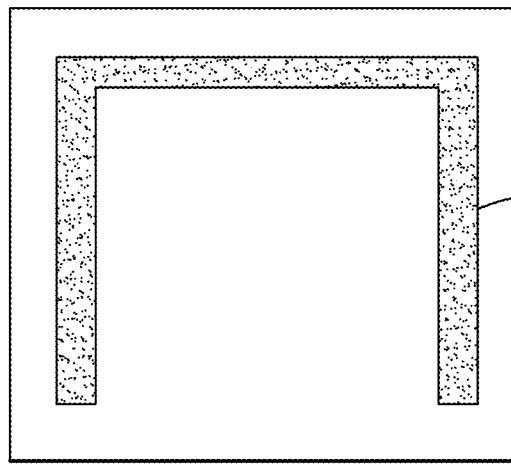
FIGS. 2F and 2G illustrate example antennas according to certain embodiments.
Figure 2G:
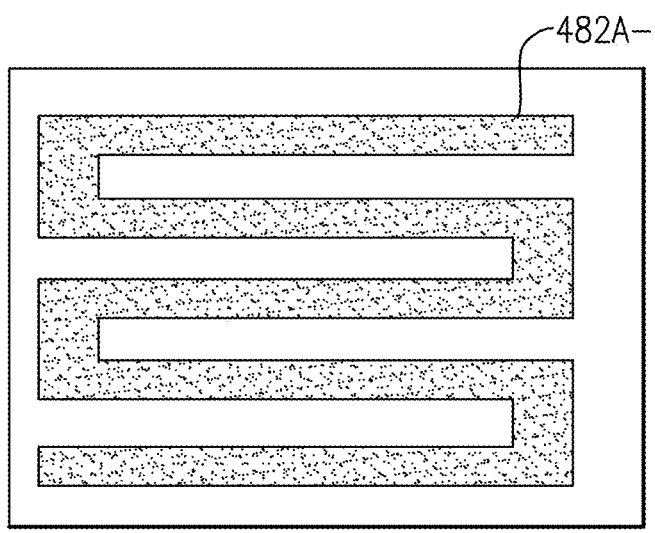

The antenna layer 482A-482C of any of the antenna 480A-480C in package systems 14A-14C discussed herein can include any suitable antenna shape and size. FIGS. 2F and 2G illustrate example antennas of radio frequency circuit assemblies according to certain embodiments. These figures illustrate examples of a top view of an integrated antenna module or package, such as the package 14A-14C. The antenna layer 482A-482C can be any suitable shape. For instance, the antenna layer 482A-482C can be U-shaped as shown in FIG. 2F. The antenna layer 482A-482C in FIG. 2F can be a folded quarter wave antenna. As another example, the antenna layer 482A-482C can be a meandering shape as shown in FIG. 2G. The antenna can be coil shaped in certain implementations. The antenna can be a loop antenna in some implementations. The antenna layer 482A-482C can serve as an antenna for a system on a chip. Such antennas can be configured to transmit and/or receive Bluetooth and/or Zig-Bee signals, for example. The antenna of the antenna layer 482A-482C can be in communication with transmit and/or receive circuitry by way of one or more wire bonds, by way of one or more vias extending through a substrate over which the antenna is disposed as discussed above, by way of magnetic coupling, or any combination thereof.

Figure 3:
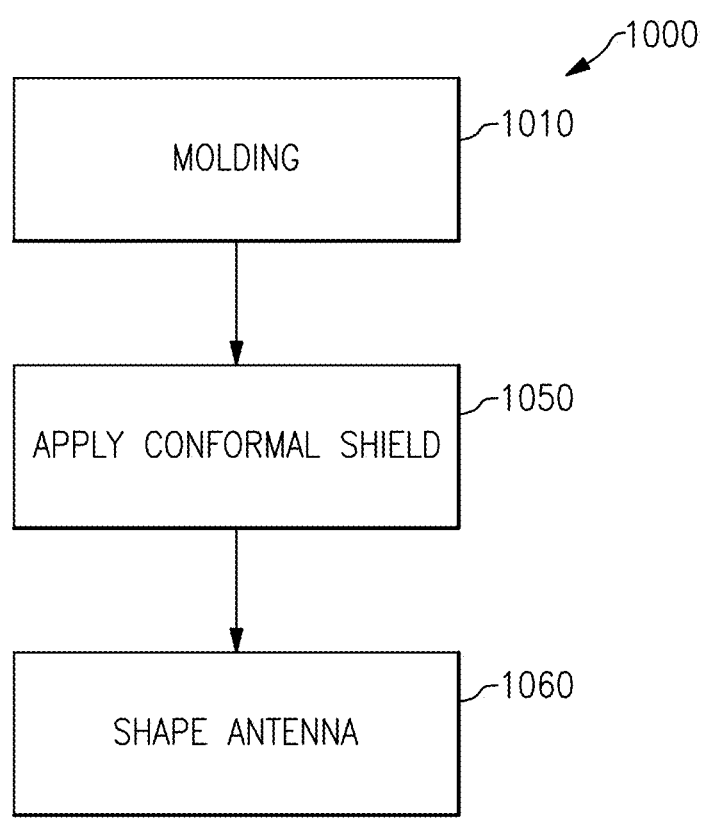
FIG. 3 is a block diagram of one embodiment of a method of manufacturing an integrated antenna module.

FIG. 3 shows a flow diagram of an illustrative process 1000 of making the package 14A-14B. At block 1010, the mold compound layer 310A, 310B is formed. The mold compound 310A, 310B can be made of plastic. The thickness t1, t2 of the mold compound layer 310A, 310B can be varied as desired for the antenna structure. At block 1050, a metal layer is applied over a top surface of the mold compound 310A, 310B. In one embodiment, the metal layer is formed by sputtering metal over the over a top surface of the mold compound 310A, 310B to form a conformal shield. However, the metal layer can be applied to the mold compound 310A, 310B in other suitable manners (e.g., sprayed, printed, etc.). At block 1060, at least a portion of the applied metal layer of the conformal shield is removed to define the shape of the antenna 480A, 480B. In one embodiment, the metal of the conformal shield is ablated (or etched) to define the shape of the antenna layer 480A, 480B.

Figure 4:
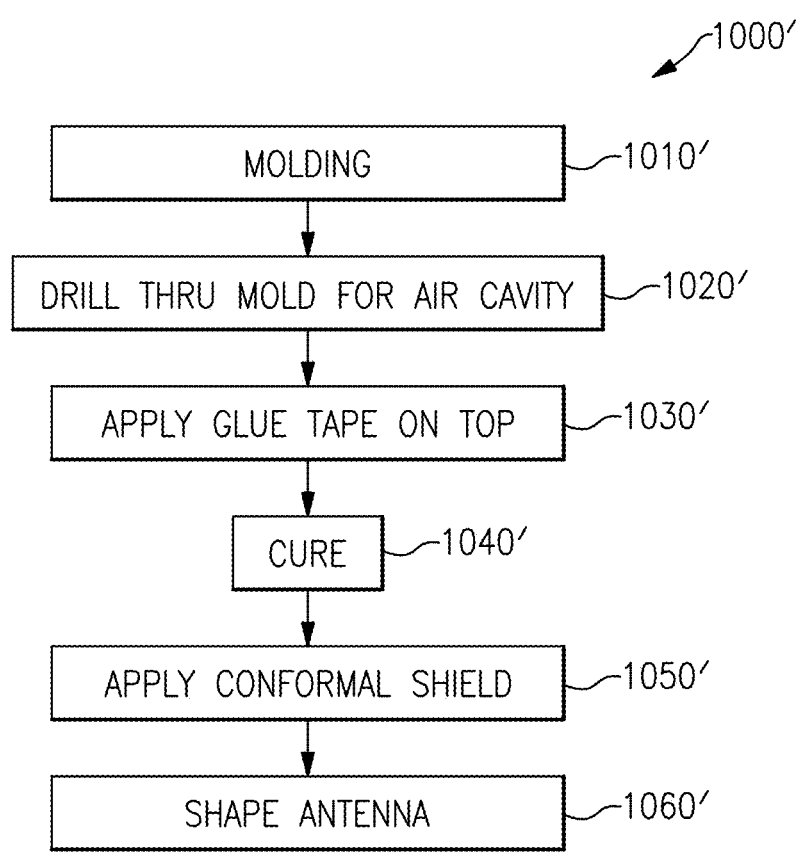
FIG. 4 is a block diagram of another embodiment of a method of manufacturing an integrated antenna module.

FIG. 4 shows a flow diagram of an illustrative process 1000' of making the package 14C. At block 1010', the mold compound 310C layer is formed. The mold compound 310C can be made of plastic. The thickness t3 of the mold compound layer 310C can be varied as desired for the antenna structure. At block 1020', a cavity 490C can be formed in the mold compound 310C. In one embodiment, the cavity 490C is formed by drilling through the mold compound 310C. Optionally, the walls of the cavity 490C can be lined with a cover layer (e.g., metal, glue tape, etc.). At block 1030', a cover layer is applied over a top opening of the cavity 490C in the mold compound 310C. In one embodiment, the cover layer is a glue tape that is applied over the top opening of the cavity 410C. At block 1040', the cover layer, such as glue tape, can be cured to harden the cover layer. At block 1050', a metal layer is applied over a top surface of the mold compound 310C, including over the cured cover layer. In one embodiment, the metal layer is formed by sputtering metal over the over a top surface of the mold compound 310C, including over the cured cover layer, to form a conformal shield. However, the metal layer can be applied to the mold compound 310C in other suitable manners (e.g., sprayed, printed, etc.). At block 1060', at least a portion of the sputtered metal of the conformal shield is removed to define the shape of the antenna. In one embodiment, the sputtered metal of the conformal shield is ablated (or etched) to define the shape of the antenna layer 480C.

Figure 5A:
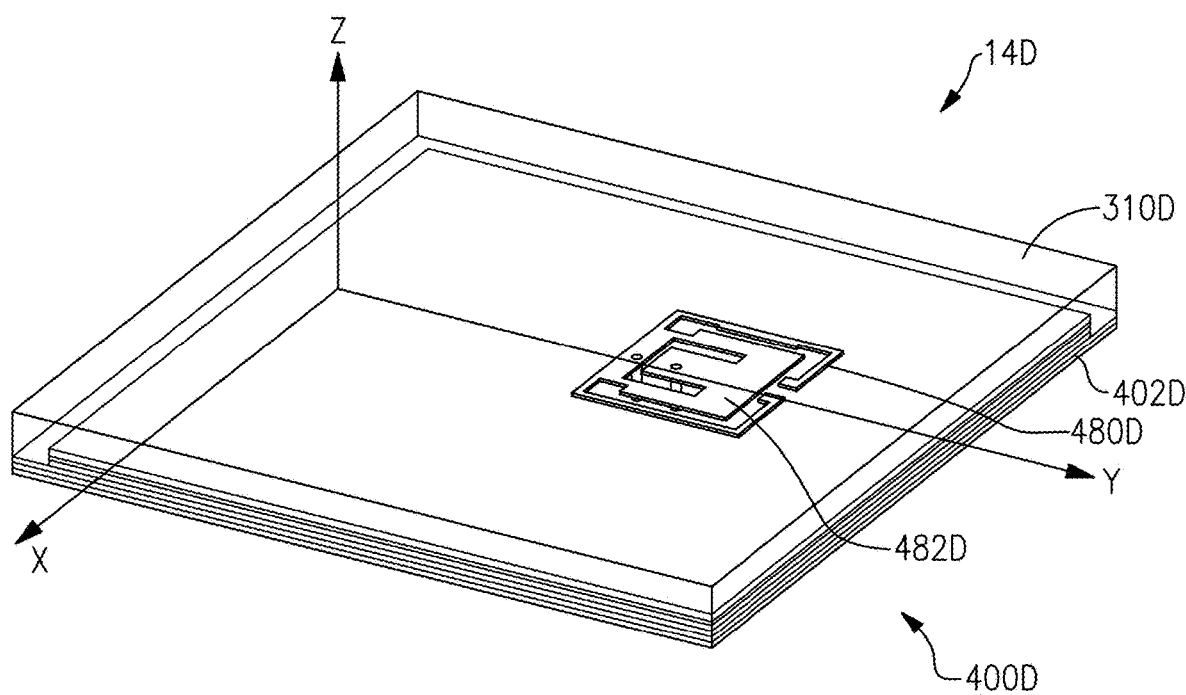
FIG. 5A is a schematic perspective view of an embodiment of an integrated antenna module.
Figure 5C:
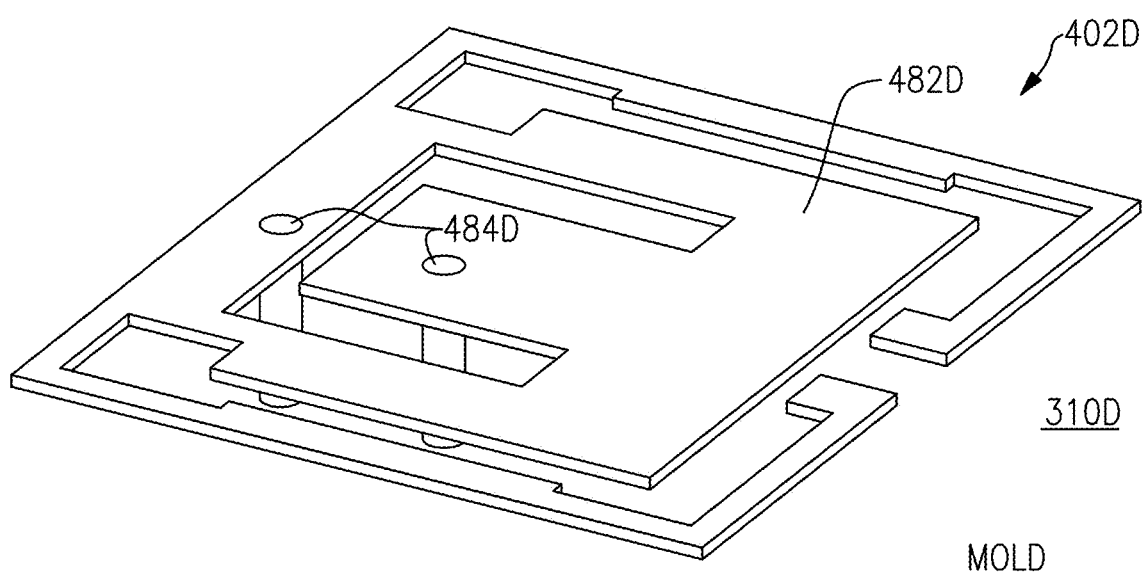
FIG. 5C is an enlarged view of a portion of the an integrated antenna module design of FIG. 5A.

FIGS. 5A-5C show an embodiment of a package 14D that is similar to the package 14A in FIG. 2B, except as described below. The package 14D is constructed similar to the package 14A shown in FIG. 2B, except as noted below. Therefore, the references numerals used to designate the various components of the package 14D are identical to those used for identifying the corresponding components of the package 14A in FIG. 2B, except that a "D" has been added to the reference numerals. In FIGS. 5A-5C, the metal layer 482D has a generally square shape with cutouts and is connected via two vias 484D to a layer (e.g., ground plane) 402D of the PCB 400D. However, in other embodiments, the metal layer 482D can have other shapes (e.g., rectangular, octagonal, etc.) and sizes, such as those shown in FIG. 3E-3F.

Figure 5D:
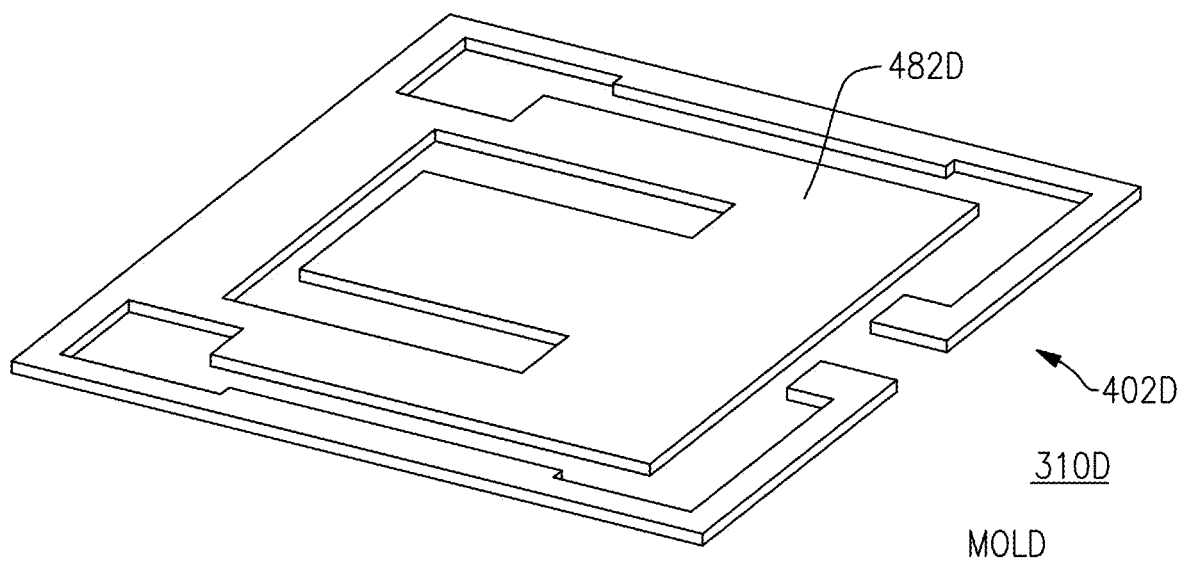
FIG. 5D is an enlarged view of a portion of a an integrated antenna module design.

FIG. 5D shows a variation of the package 14D show in FIGS. 5A-5C, where the metal layer 382D is not connected with vias to the PCB 400D. In this embodiment, transmission between the metal layer 382D and the PCB 400D can occur via resonation of the metal layer 382D via capacitors (e.g., via the mold compound 310D or an air cavity 490C).

Figure 5E:
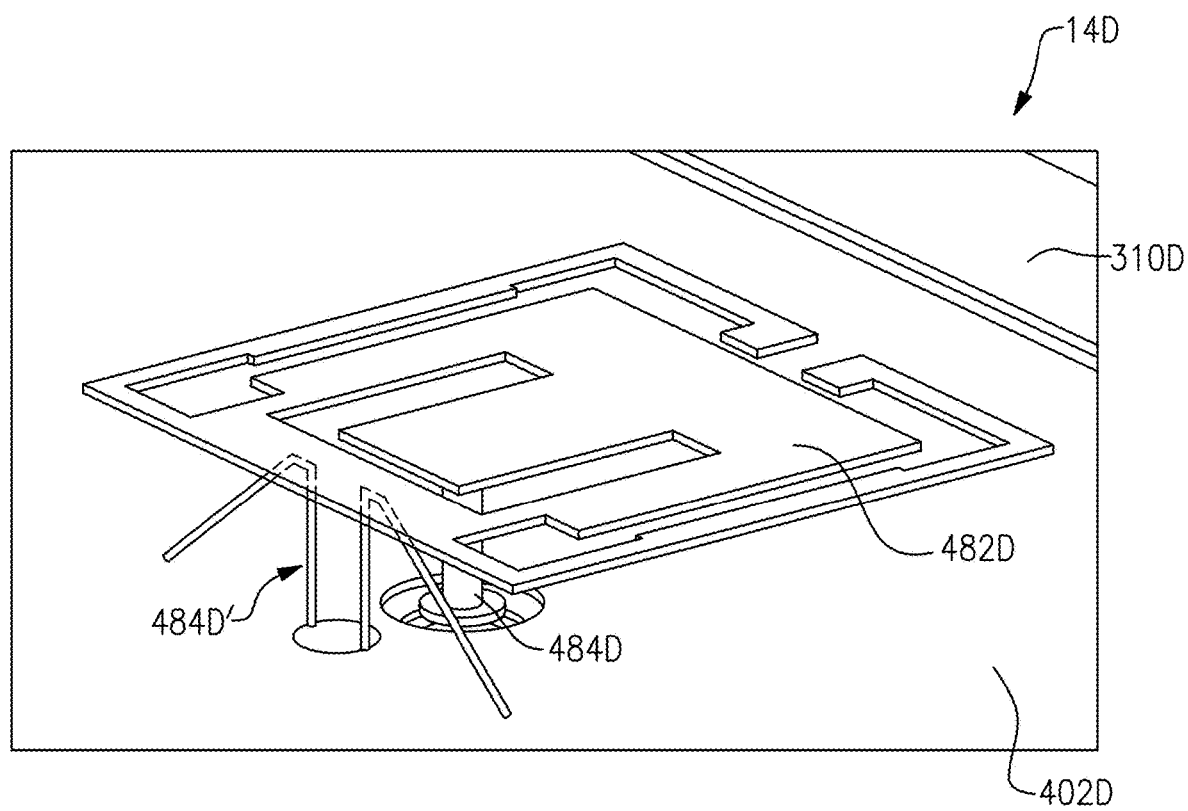
FIG. 5E is an enlarged view of a portion of an integrated antenna module design.

FIG. 5E shows a variation of the package 14D shown in FIGS. 5A-5C. In the illustrated embodiment, the metal layer 482D is connected to a layer 402D (e.g., ground layer) in the PCB 400D by a via 484D and a bondwire 484D'. The bondwire 484D' can optionally be 25 μm in diameter (e.g., made of gold). In some embodiments, a plurality of bondwires can be disposed around the metal layer 482D to facilitate tuning of the antenna 480D. The use of bondwires 484D' can advantageously allow optimization of antenna performance, and results in reduced cost of manufacturing the package 14D.

Figure 6:
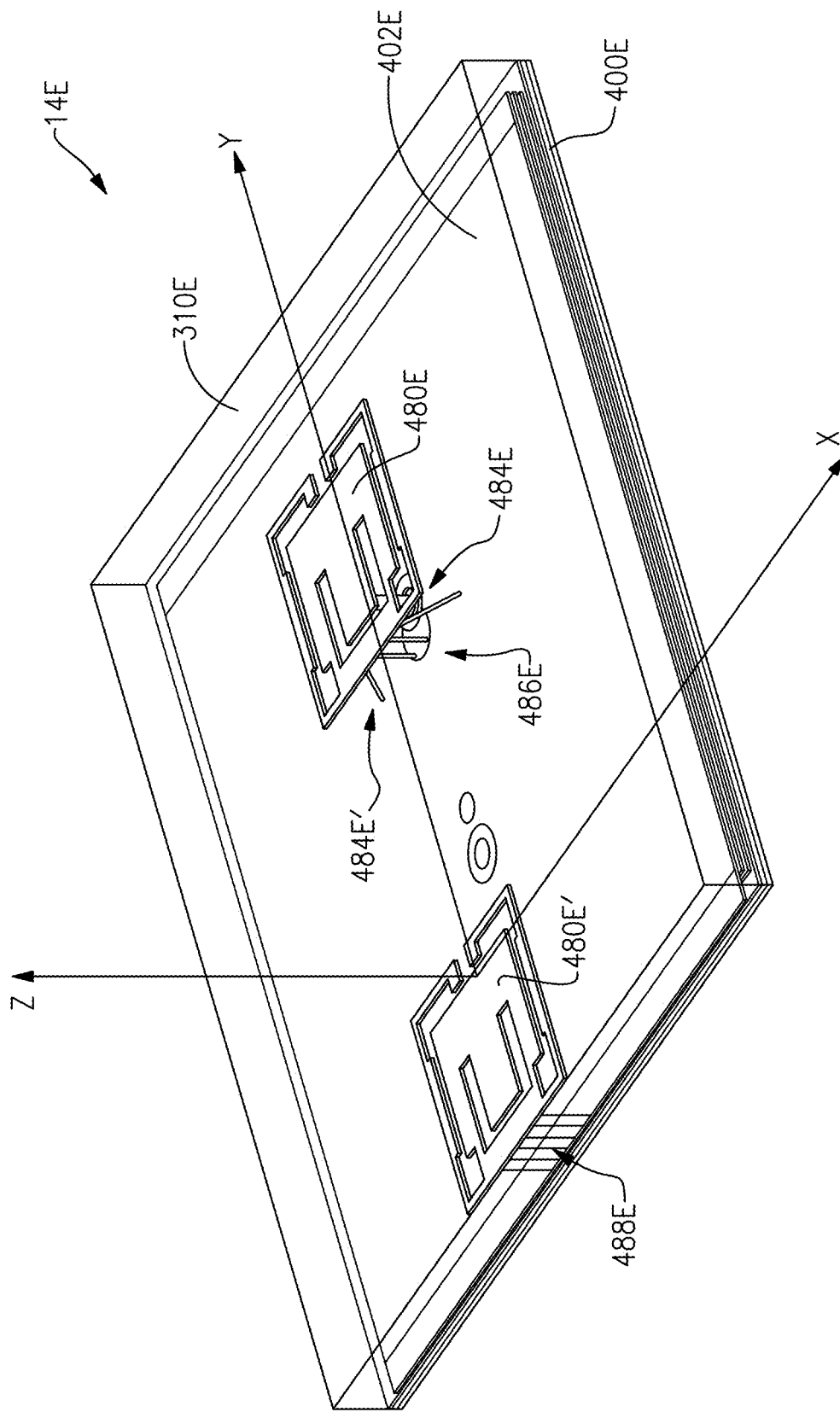
FIG. 6 is a perspective view of an embodiment of an integrated antenna module design.

FIG. 6 shows an embodiment of a package 14E that is similar to the package 14A in FIG. 2B, except as described below. The package 14E is similar to the package 14A shown in FIG. 2B, except as noted below. Therefore, the references numerals used to designate the various components of the package 14E are identical to those used for identifying the corresponding components of the package 14A in FIG. 2B, except that a "E" has been added to the reference numerals.

In the illustrated embodiment, the package 14E has two antenna structures 480E and 480E' with corresponding metal layers 482E, 482E' disposed on top of the mold compound 310E so that the mold compound 310E is between the metal layers 482E, 482E' and the PCB module 400E. The metal layer 482E of the antenna structure 480E can be connected to a layer 402E (e.g., ground layer) of the PCB module 400E by a via 848E and one or more bondwires 486E, in a similar manner as shown in FIG. 5E. In one embodiment, a plurality of bondwires 486E can be disposed about the antenna 480E to facilitate tuning of the antenna 480E to optimize performance of the antenna 480E. In another embodiment, the plurality of bondwires 486E can be disposed about both of the antennas 480E and 480E' to improve isolation between both antennas 480E, 480E'.

The metal layer 484E' of the antenna structure 480E can be connected to the layer 402E (e.g., ground layers) of the PCB module 400E by one or more edge lines 488E that extend along a slide of the package 14E. In the illustrated embodiment, three edge lines 488E connect the metal layer 482E' with the layer 402E. However, in other embodiments, fewer or more edge lines 488E can be used. The width of the edge lines 488E can vary, and the number of edge lines 488E can be varied to optimize the performance of the antenna 480E' (e.g., low frequency antenna such as 1 GHz, very high frequency antenna, such as 60 GHz, 100 GHz). Though the illustrated embodiment shows two antenna structures 480E, 480E' on the package 14E, one of skill in the art will recognize that the package 14E can have fewer or more antenna structures. In the illustrated embodiment, the metal layers 482E, 482E' are disposed along the same plane (e.g., a first surface of the package 14E). However, in other embodiments, the metal layers 482E, 482E' can be disposed along different planes of the package 14E (e.g., one metal layer along a first surface and a second metal layer along a second surface that is perpendicular to the first surface). In the illustrated embodiment, the edge lines 488E can be optimized to operate as an antenna (e.g., where the metal layer 480E' is removed from on top of the mold compound 310E).

FIGS. 7A to 7D illustrate example component layers of radio frequency circuit assemblies according to certain embodiments. These figures include schematic views of a bottom view of a radio frequency circuit assembly, such as the radio frequency circuit assembly 14A-14E.

As illustrated in FIGS. 7A to 7D, ground solder bumps 470 can surround an RF component and form a portion of a shielding structure around the RF component. The ground solder bumps 470 can be disposed along each edge of the component layer 414. The ground solder bumps 470 can be soldered to a ground connection of a carrier assembly such that the ground plane, the solder bumps 470, and ground of the carrier assembly together provide three-dimensional shielding of the RF component. The carrier assembly can be implemented by ethylvinylbenzene (EVB) or another laminate, for example.

As illustrated, the ground solder bumps 470 surround signal routing solder bumps 71. The signal routing solder bumps 71 can provide at least a portion of a connection between circuitry of the component layer 414 with metal routing in a routing layer that is disposed between the component layer 414 and the ground plane 402A-402D (see FIGS. 2B-2E, 5A-5C).

The example component layers of FIGS. 7A to 7D illustrate various electronic components that can be shielded from the antenna layer 482A-482D of the antenna 480A-480D by the ground plane 402A-402D. FIG. 7A illustrates a component layer 414 that includes an RF component 450 connected to signal routing solder bumps 71. Some example RF components are illustrated in FIGS. 7B to 7D. FIG. 7B illustrates a component layer 414' that includes a low noise amplifier (LNA) 72 and a matching network 73. FIG. 7C illustrates a component layer 414" that includes a power amplifier 74 and a matching network 75. FIG. 7D illustrates a component layer 414''' that includes an LNA 72, a power amplifier 74, and matching networks 73 and 75. The circuits illustrated in FIGS. 7A to 7D are connected to signal routing solder bumps 71 and are surrounded by the ground solder bumps 470 in a respective component layer.

Figure 8A:
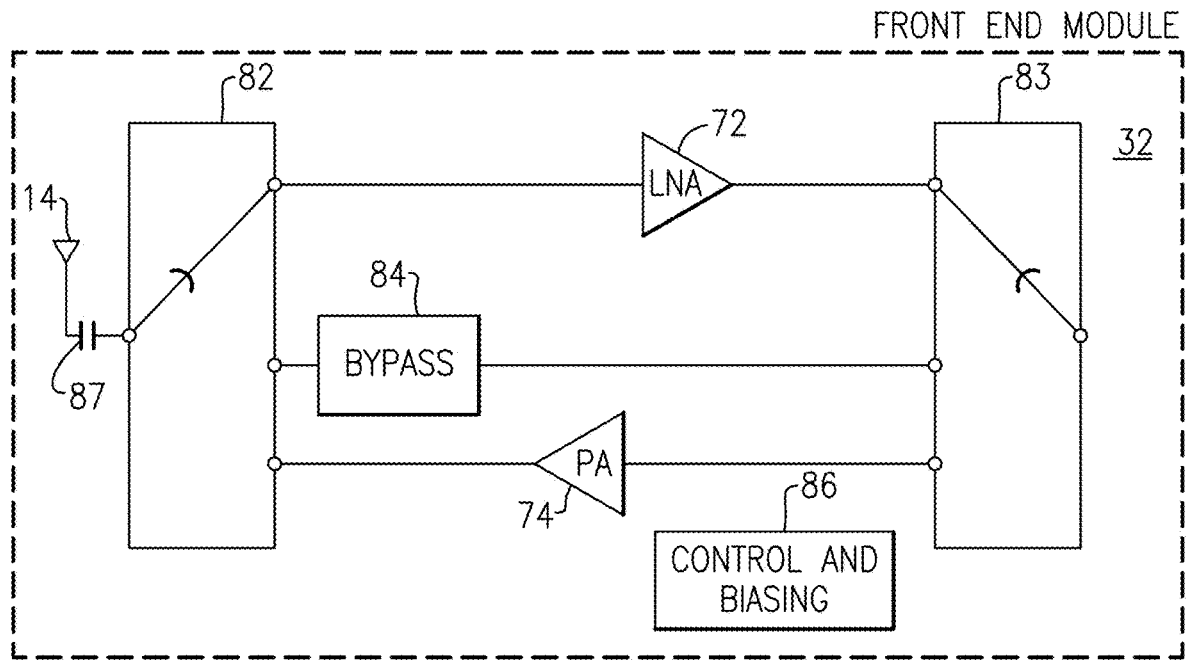
FIGS. 8A, 8B, and 8C are schematic block diagrams of front end modules according to certain embodiments.
Figure 8B:
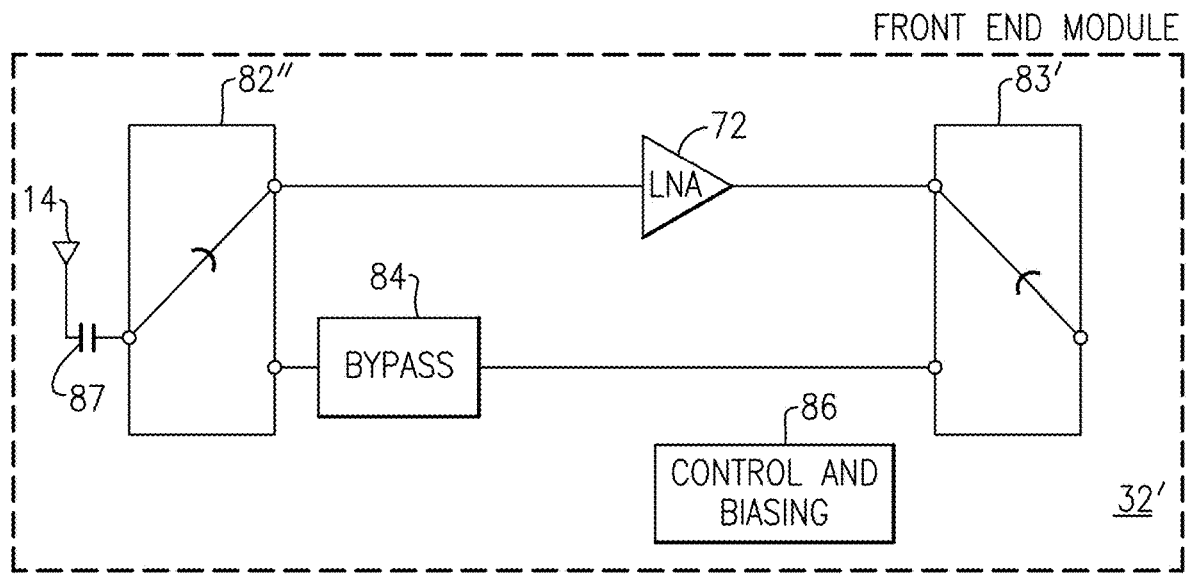
Figure 8C:
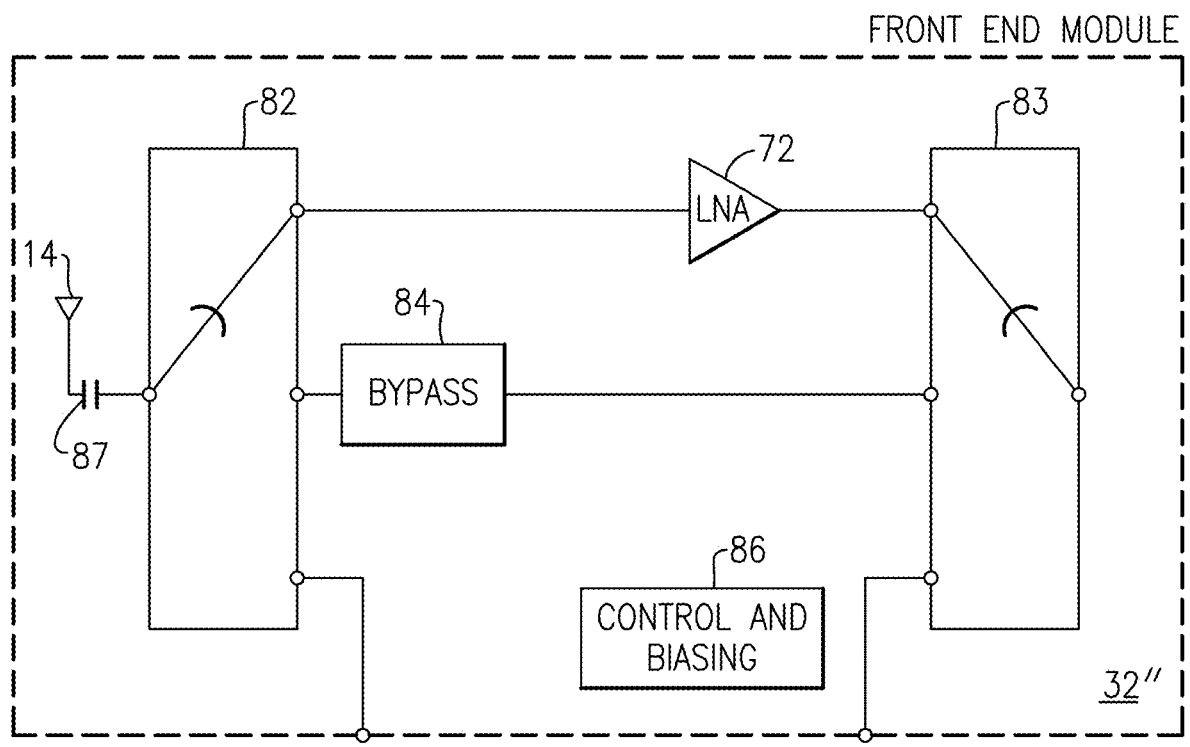

FIGS. 8A, 8B, and 8C are schematic block diagrams of front end modules with integrated antennas according to certain embodiments. An RF front end can include circuits in a signal path between an antenna and a baseband system. Some RF front ends can include circuits in signal paths between one or more antennas and a mixer configured to module a signal to RF or to demodulate an RF signal.

The front end modules of FIGS. 8A, 8B, and 8C can be packaged modules. Such packaged modules can include relatively low cost laminate based front end modules that combine low noise amplifiers with power noise amplifiers and/or RF switches in certain implementations. Some such packaged modules can be multi-chip modules. In the modules of FIGS. 8A, 8B, and 8C, an antenna is integrated with the RF front end. The integrated antenna of such RF front end modules can be implemented in accordance with any of the principles and advantages discussed herein. The integrated antenna can be implemented, in one embodiment, in an antenna layer on a first side of a substrate that is shielded from the circuits of the RF front end on a second side of the substrate at least partly by a ground plane implemented in a layer of the substrate.

FIG. 8A is a schematic block diagram of an RF front end module 32 according to an embodiment. The RF front end module 32 is configured to receive RF signals from an integrated antenna 14 and to transmit RF signals by way of the integrated antenna 14. The integrated antenna 14 can be implemented in accordance with any of the principles and advantages discussed herein. The illustrated front end system 32 includes a first multi-throw switch 82, a second multi-throw switch 83, a receive signal path that includes an LNA 72, a bypass signal path that includes a bypass network 84, and a transmit signal path that includes a power amplifier 74. The low noise amplifier 72 can be any suitable low noise amplifier. The bypass network 84 can include any suitable network for matching and/or bypassing the receive signal path and the transmit signal path. The bypass network 84 can be implemented by a passive impedance network and/or by a conductive trace or wire. The power amplifier 74 can be implemented by any suitable power amplifier. The LNA 72, the switches 82 and 83, and the power amplifier 74 can be shielded from the antenna 14 by a shielding structure in accordance with any of the principles and advantages discussed herein.

The first multi-throw switch 82 can selectively electrically connect a particular signal path to the antenna 14. The first multi-throw switch 82 can electrically connect the receive signal path to the antenna 14 in a first state, electrically connect the bypass signal path to the antenna 14 in a second state, and electrically connect the transmit signal to the antenna 14 in a third state. The antenna 14 can be electrically connected to the switch 82 by way of a capacitor 87. The second multi-throw switch 83 can selectively electrically connect a particular signal path to an input/output port of the front end module 32, in which the particular signal path is the same signal path electrically connected to the antenna 14 by way of the first multi-throw switch 82. Accordingly, second multi-throw switch 83 together with the first multi-throw switch 82 can provide a signal path between the antenna 14 and an input/output port of the front end module 32. A system on a chip (SOC) can be electrically connected to the input/output port of the front end module 32.

The control and biasing block 86 can provide any suitable biasing and control signals to the other circuits of the front end module 32. For example, the control and biasing block 86 can provide bias signals to the LNA 72 and/or the power amplifier 74. Alternatively or additionally, the control and biasing block 86 can provide control signals to the multi-throw switches 82 and 83 to set the state of these switches.

FIG. 8B is a schematic block diagram of an RF front end module 32' according to an embodiment. The RF front end system 32' of FIG. 8B is similar to the RF front end module 32 of FIG. 8A, except that a transmit signal path is omitted and the multi-throw switches 82' and 83' each have one fewer throw. The illustrated front end module 32' includes a receive signal path and a bypass signal path and does not include a transmit signal path.

FIG. 8C is a schematic block diagram of an RF front end module 32" according to an embodiment. The RF front end module 32" of FIG. 8C is like the RF front end module 32 of FIG. 8A, except that a power amplifier of the transmit signal path is omitted from the RF front end module 32". The RF front end module 32" includes input/output ports for coupling to throws of the multi-throw switches 82 and 83. A power amplifier external to the front end module 32" can be electrically connected between these input/output ports such that the power amplifier is included in the transmit signal path between the multi-throw switches 82 and 83. The power amplifier can be included in a different packaged module the illustrated elements of the RF front end module 32".

Figure 9:
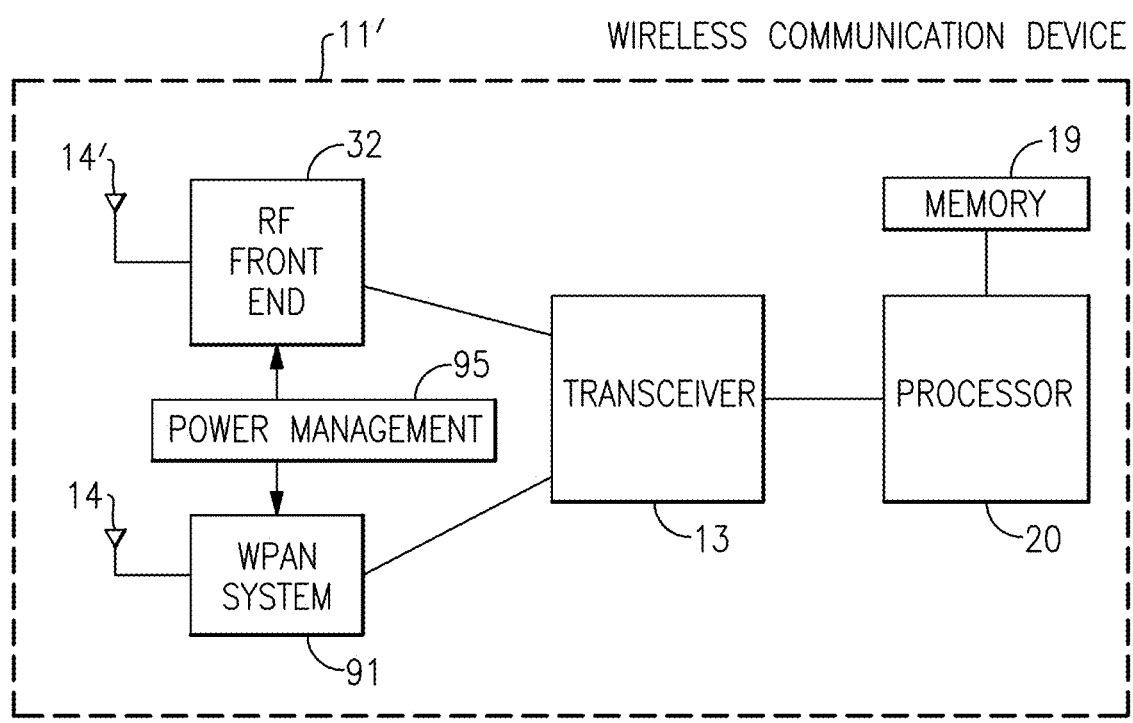
FIG. 9 is a schematic block diagram of a wireless communication device that includes a shielded package with an integrated antenna in accordance with one or more embodiments.

FIG. 9 is a schematic block diagram of an illustrative wireless communication device that includes a shielded package with an integrated antenna in accordance with one or more embodiments. The wireless communication device 11' can be any suitable wireless communication device. For instance, this device can be a mobile phone such as a smart phone. As illustrated, the wireless communication device 11' includes a first antenna 14 integrated with a wireless personal area network (WPAN) system 91, a transceiver 13, a processor 20, a memory 19, a power management block 95, a second antenna 14', and an RF front end system 32. Any of the integrated antennas and shielding structures discussed herein can be implemented in connection with the WPAN system 91. The WPAN system 91 is an RF front end system configured for processing RF signals associated with personal area networks (PANs). The WPAN system 91 can be configured to transmit and receive signals associated with one or more WPAN communication standards, such as signals associated with one or more of Bluetooth, ZigBee, Z-Wave, Wireless USB, INSTEON, IrDA, or Body Area Network. In another embodiment, a wireless communication device can include a wireless local area network (WLAN) system in place of the illustrated WPAN system, and the WLAN system can process Wi-Fi signals. Any of the integrated antennas and shielding structures discussed herein can be integrated with the RF front end system 32.

Some of the embodiments described above have provided examples in connection with RF components, front end modules and/or wireless communications devices. However, the principles and advantages of the embodiments can be used for any other systems or apparatus that could benefit from any of the circuits described herein. Although described in the context of RF circuits, one or more features described herein can also be utilized in packaging applications involving non-RF components. Similarly, one or more features described herein can also be utilized in packaging applications without the electromagnetic isolation functionality. Any of the principles and advantages of the embodiments discussed can be used in any other systems or apparatus that could benefit from the antennas and/or the shielding structures discussed herein.

Aspects of this disclosure can be implemented in various electronic devices. Examples of the electronic devices can include, but are not limited to, consumer electronic products, parts of the consumer electronic products, electronic test equipment, cellular communications infrastructure such as a base station, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a personal digital assistant (PDA), a microwave, a refrigerator, a vehicular electronics system such as an automotive electronics system, a stereo system, a DVD player, a CD player, a digital music player such as an MP3 player, a radio, a camcorder, a camera such as a digital camera, a portable memory chip, a washer, a dryer, a washer/dryer, peripheral device, a clock, etc. Further, the electronic devices can include unfinished products.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description of Certain Embodiments using the singular or plural number may also include the plural or singular number, respectively. The word "or" in reference to a list of two or more items, that word covers all of the following interpretations of the word: any of the items in the list, all of the items in the list, and any combination of the items in the list.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure.

For example, one portion of one of the embodiments described herein can be substituted for another portion in another embodiment described herein. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method of making an antenna structure comprising:
    forming a mold compound layer;
    forming a cavity in the mold compound layer;
    attaching the mold compound layer to a printed circuit board;
    applying a cover layer over the cavity to enclose the cavity;
    hardening the cover layer;
    applying a conformal shield layer on a first surface of the mold compound layer and the hardened cover layer, the mold compound layer being a single layer with a portion of a thickness that extends from the conformal shield layer to the printed circuit board; and
    shaping the conformal shield layer to define a planar antenna structure.

2. The method of claim 1 wherein the cavity is filled with air and defines an antenna.

3. The method of claim 1 wherein applying the cover layer includes applying a tape to the mold compound layer.

4. The method of claim 3 wherein hardening the cover layer includes curing the tape to harden it prior to applying the conformal shield layer.

5. The method of claim 1 wherein forming the mold compound includes varying a thickness of the mold compound to improve a performance of the antenna structure.

6. The method of claim 1 wherein applying the conformal shield layer includes sputtering metal over the mold compound.

7. The method of claim 1 wherein applying the conformal shield layer includes spraying metal over the mold compound.

8. The method of claim 1 wherein shaping of the conformal shield layer includes removing metal from the conformal shield layer to define a shape for the antenna.

9. The method of claim 8 wherein removing metal from the conformal shield layer includes ablating the conformal shield layer to improve the performance of the antenna structure.

10. The method of claim 1 further comprising connecting the conformal shield layer to a ground plane of the printed circuit board by one or more connections chosen from the group consisting of vias and wirebonds.

11. The method of claim 1 wherein the mold compound or cavity connects the conformal shield layer to a ground plane of the printed circuit board via capacitive coupling.

12. The method of claim 1 further comprising connecting the conformal shield layer to a ground plane of the printed circuit board via one or more edge lines extending along a second surface of the mold compound that is perpendicular to the first surface.

* * * * *